US010715547B2

(12) United States Patent
Edwards et al.

(10) Patent No.: US 10,715,547 B2
(45) Date of Patent: Jul. 14, 2020

(54) DETECTING "MAN-IN-THE-MIDDLE" ATTACKS

(71) Applicant: WANDERA LIMITED, London (GB)

(72) Inventors: John Edwards, London (GB); Matthew Vlasach, London (GB)

(73) Assignee: Wandera Limited, London (GB)

(*) Notice: Subject to any disclaimer, the term of this patent is extended or adjusted under 35 U.S.C. 154(b) by 0 days.

(21) Appl. No.: 15/565,056

(22) PCT Filed: Apr. 8, 2016

(86) PCT No.: PCT/GB2016/050987
§ 371 (c)(1),
(2) Date: Oct. 6, 2017

(87) PCT Pub. No.: WO2016/162687
PCT Pub. Date: Oct. 13, 2016

(65) Prior Publication Data
US 2018/0124106 A1 May 3, 2018

(30) Foreign Application Priority Data

Apr. 9, 2015 (GB) .................................. 1506063.5

(51) Int. Cl.
*H04L 29/06* (2006.01)
*H04L 9/32* (2006.01)
(52) U.S. Cl.
CPC ........ *H04L 63/1466* (2013.01); *H04L 9/3268* (2013.01); *H04L 63/1441* (2013.01); *H04L 63/20* (2013.01)
(58) Field of Classification Search
CPC ... H04L 63/1466; H04L 63/20; H04L 9/3268; H04L 63/1441
See application file for complete search history.

(56) References Cited

U.S. PATENT DOCUMENTS 8,151,348 B1   4/2012 Day
8,484,460 B1   7/2013 Vaughn
(Continued)

FOREIGN PATENT DOCUMENTS

GB   2 469 287 A    10/2010
WO   2014/060873 A1  4/2014

OTHER PUBLICATIONS

Joshi et al., "Mitigating man in the middle attack over secure sockets layer", 2009 IEEE International Conference on Internet Multimedia Services Architecture and Applications (IMSAA), Date of Conference: Dec. 9-11 (Year: 2009).*

(Continued)

*Primary Examiner* — Morshed Mehedi
(74) *Attorney, Agent, or Firm* — Polsinelli

(57) ABSTRACT

A method for detecting a man-in-the-middle attack against communications between a client device and a specific remote end point over a network, the method using probe software installed on the client device, the method comprising the probe software sending a connection initiation request from the client device over the network, directed to the remote end point, to at least partially initiate a secure network connection between the remote end point and the client device, receiving at the client device encryption credentials sent to the client device in response to the connection initiation request, the probe software comparing the received encryption credentials with expected encryption credentials for the remote end point, and the probe software determining that a man-in-the-middle attack is present if the received encryption credentials do no match the expected encryption credentials.

20 Claims, 4 Drawing Sheets

(56) References Cited

U.S. PATENT DOCUMENTS

| | | | |
|---|---|---|---|
| 8,677,466 B1 | 3/2014 | Chuang et al. | |
| 8,806,629 B1* | 8/2014 | Cherepov | G06F 21/554 |
| | | | 726/23 |
| 9,165,126 B1* | 10/2015 | Johansson | G06F 21/31 |
| 9,262,470 B1* | 2/2016 | Evans | G06Q 30/0255 |
| 2009/0055642 A1* | 2/2009 | Myers | H04L 63/0869 |
| | | | 713/155 |
| 2009/0210712 A1* | 8/2009 | Fort | H04L 63/1441 |
| | | | 713/175 |
| 2009/0228707 A1 | 9/2009 | Linsky | |
| 2011/0087899 A1* | 4/2011 | Fetik | G06F 21/552 |
| | | | 713/193 |
| 2013/0040603 A1* | 2/2013 | Stahlberg | H04L 63/126 |
| | | | 455/410 |
| 2014/0259147 A1* | 9/2014 | L'Heureux | H04L 63/02 |
| | | | 726/14 |

OTHER PUBLICATIONS

Glass et al., "Detecting Man-in-the-Middle and Wormhole Attacks in Wireless Mesh Networks", International Conference on Advanced Information Networking and Applications, Date of Conference: May 26-29, 2009.*
GB Search Report dated Jan. 27, 2016, for GB1506063.5, 3 pages.
International Search Report dated Jun. 16, 2016, for PCT/GB2016/050987, 12 pages.

* cited by examiner (a)

(b)

DETECTING "MAN-IN-THE-MIDDLE" ATTACKS

TECHNICAL FIELD

The present invention relates generally to methods, systems and software applications for detecting a man-in-the-middle attack.

BACKGROUND

Man-in-the-middle attacks represent a significant security threat to network communications.

FIG. 1 (a) schematically illustrates normal communications passing between a client device and a remote end point (such as a web server) over a communications network (for example a public network such as the Internet). A man-in-the-middle attack is an attack in which a third party (typically a malicious party) intercepts communications passing between the client device (or other communication initiating point) and the remote end point.

As illustrated schematically in FIG. 1 (b), the man-in-the-middle may intercept communications between the client device and remote end point but relays them on to their destination (indicated by the solid line arrows). In this form of attack the man-in-the-middle may simply be interested in obtaining a copy of the communications that are passing between the client device and remote end point. Alternatively, the man-in-the-middle may act to alter to communications before they are relayed.

In an alternative form of man-in-the-middle attack, the man-in-the-middle may masquerade as the intended remote end point, receiving communications from the client device and responding directly to the client device, without the communication ever reaching the remote end point (as indicated by the dashed line arrows).

In either of these scenarios, the man-in-the-middle in effect has control of the 'conversation' between the client device and the remote end point and can manipulate that 'conversation' to achieve their own, often malicious, ends. Meanwhile, the person using the client device remains oblivious to the attack and is under the impression that they are communicating as normal with the remote end point.

Initiating a man-in-the-middle attack against unencrypted communications is relatively straight forward. For this reason, it is commonplace to use certificate-based encrypted communications, especially where the information that is passing is sensitive or where the messages that are passing include instructions to initiate financial or other transactions for example. The operation of certificate-based encryption, involving the exchange of public keys/certificates is well known to the skilled person and will not be described here.

However, if an attacker is somehow able to get access to the private component of a certificate which is already trusted on the device, or alternatively deploys a certificate to the device, or uses social engineering to persuade the end user to trust a new root certificate, then a man in the middle attack can also be launched against a supposedly secure connection.

Approaches have been proposed to secure communications (sent over a public network) against man-in-the-middle attacks. Known approaches require an additional exchange or transmission of information over a separate secure channel. One example of such an approach is "certificate pinning".

Certificate pinning is an additional check in the normal TLS or SSL protocol and involves an independent check of the validity of the end point's certificate once it has been obtained from the end point. This involves checking the certificate against validation data that is typically integral with a specific application on the client device from which communications with the remote end point are initiated. Whilst this approach can provide an application specific counter-measure against man-in-the-middle attacks, it does not help secure communications initiated by other applications on the client device. A more generic protection against man-in-the-middle attacks would be beneficial.

SUMMARY OF THE INVENTION

In general terms, the invention proposes probe software installed on a client device to at least partially initiate a secure network connection with a known remote end point for which the probe software already has verified encryption credentials. When the client device receives, in response to a request from the client device, encryption credentials that purport to be from the end point, they can be compared with the verified encryption credentials that the probe software already holds to determine whether the reply has in fact come from the end point or, instead, from a man-in-the-middle that has intercepted the request. In a preferred aspect, the request sent by the probe software can be configured to mimic a request from application software installed on the client device. In this way, sophisticated man-in-the-middle attacks that target communications from particular application programs can also be detected.

In a first aspect, the invention provides a method for detecting a man-in-the-middle attack against communications between a client device and a specific remote end point over a network, the method using probe software installed on the client device, the method comprising:

the probe software sending a connection initiation request from the client device over the network, directed to the remote end point, to at least partially initiate a secure network connection between the remote end point and the client device;

receiving at the client device encryption credentials sent to the client device in response to the connection initiation request;

the probe software comparing the received encryption credentials with expected encryption credentials for the remote end point; and the probe software determining that a man-in-the-middle attack is present if the received encryption credentials do no match the expected encryption credentials.

In determining that a man-in-the-middle attack is present against its own connections, the probe software can infer that such an attack is also ongoing against other applications—or the operating system—on the device, and can alert the user directly or by communicating with some external management software. Importantly, the probe software detects the presence of the attack against other applications on the device without requiring that they have their own certificate pinning functionality.

The probe software only need proceed sufficiently far through the initiation of a secure connection to establish whether or not a MiTM attack is taking place. Typically, this will involve the probe software sending a connection initiation request to the remote end point and receiving a response including the encryption credentials. In some embodiments, the probe software will then terminate the connection, rather than completing the initiation of the secure network connection. In other embodiments, however, the probe software may act to complete the secure connection and may even send data over the connection.

The client device may be any suitable network connectable computing device. Examples include smart phones, wearables (e.g. smart watches), laptop, desktop, set-top box, etc The remote end point may be any suitable network connectable computing device. Typically it will be a server. It may, for example, be a managed service (e.g. a managed web service) on a network connected device.

The network will typically be a public network such as the Internet. The secure network connection may be an HTTPS connection.

The probe software may be a standalone application or alternatively may be built into other applications (e.g. via an SDK) or into the operating system of the client device itself.

The encryption credentials may, for example, be a digital certificate, for example a digital X509 certificate.

The expected encryption credentials for the remote end point are preferably stored on the client device as part of an installation process for the probe software. These stored credentials may subsequently be updated by the probe software retrieving an update from a trusted source over a secured network connection. In some embodiments, the expected encryption credentials may be cryptographically signed via a code signature of their containing application to mitigate on-device tampering. In some embodiments, the expected encryption credentials can be retrieved from the trusted source in the first instance, after the probe software is installed, rather than being installed along with the probe software.

The trusted source from which the expected encryption credentials are retrieved may, in some embodiments, be the same network connected device or service that acts as the specific remote end point with which the probe seeks to make a secure connection.

In preferred embodiments, the connection initiation request sent by the probe software is configured to appear to be a request from application software installed on the client device. By mimicking an application request in this way, it becomes possible to detect more sophisticated man-in-the-middle attacks, for example those that are designed to only act on requests sent from specific application programs. Such sophisticated man-in-the-middle attacks would be unable to act on more generic requests, so would avoid detection by probe software using such generic requests.

The configuration of the request from the probe software may be based on data previously harvested from network requests sent from instances of an application program that is to be mimicked. This harvested data may usefully be referred to as a "signature" or "fingerprint" (these two terms being used interchangeably in the following) for the application. The requests need not only be harvested from an instance of the application program installed on the specific client device in question. They can also be harvested from requests sent by instances of the same application program on other client devices, including other client devices operating the same platform and/or different platforms. The data may, for example, be harvested at a web security proxy in the network (or other network processor), via which requests from instances of said application are passed.

Examples of the aspects of data harvested from prior network requests to make up application "signatures" can include, but are not necesarilly limited to, header information—in the case of HTTP requests this might include HTTP headers such as User-Agent, in addition to destination hostnames. Other data included in the signature in some embodiments may include a client identifier and/or platform identifier. In some embodiments the signature may include meta-information harvested from the prior network requests.

Similarly to the expected encryption credentials, the application signatures for applications installed on the client device can be initially retrieved and subsequently updated from a trusted source over a secured network connection. Alternatively they may be stored on the client device when the probe software is installed.

In the case where the probe software is mimicking an application program, the specific remote end point will typically be the remote end point to which the mimicked application would normally send requests.

In some embodiments, the method can include performing a cryptographic validation of the encryption credentials (e.g. certificate) against the client device's root store for device-level trust determination. This approach makes it possible to distinguish between a MitM that has violated the device's root trust versus just relying on the user electing to trust an untrusted certificate. It therefore provides a measure of the sophistication and severity of the MiTM attack. This additional step can be implemented, for example, using standard security libraries, such as OpenSSL or other cryptographic software.

In preferred embodiments, the method operates to generate probe requests in response to significant changes to the device on which it is installed, for example when the network transitions between Wi-Fi networks, or from cellular to or vice versa, or indeed any network transition which could warrant reevaluation of the existence of a man in the middle attack. In preferred embodiments, the method could also operate to generate probe requests in response to a signal from a remote control, for example a managed security service. This remote control might form part of an overall assessment of device security.

In a second aspect, the invention provides probe software for generating network requests that are configured to mimic network requests from an application program.

The probe software of the second aspect may operate in accordance with the method of the first aspect above, including in accordance with any one or more of the optional features of the method discussed above.

DETAILED DESCRIPTION

Figure 1:
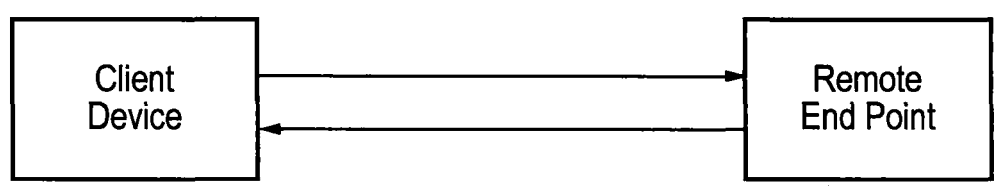
FIG. 1 illustrates the concept of a man-in-the-middle attack.
Figure 1:
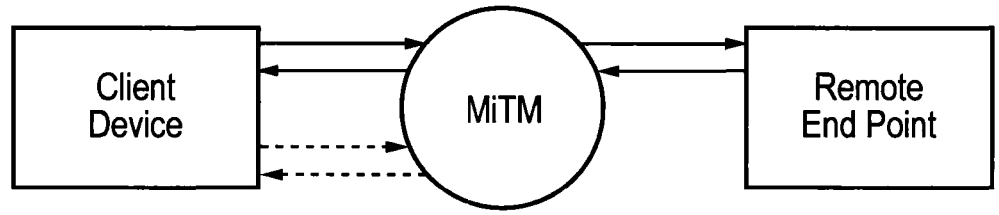

The invention will now be further described with reference to the following non-limiting Figures and Examples. Other embodiments of the invention will occur to those skilled in the art in the light of these.

Embodiments of the invention comprise probe software which is installed on a client device; this may be a smart phone, wearable (e.g. smart watch), laptop, desktop, set-top box, etc.

The probe software may be a standalone application or alternatively may be built into other applications via an SDK or into the operating system itself.

The probe software at least partially initiates a secure network connection to a known remote endpoint. For example, this may be a TLS/HTTPS connection to a managed web service.

As part of its installation, the probe software has prior knowledge of the digital certificates that it expects to retrieve from the remote endpoint.

Once the connection has been established, the client compares the encryption details from the connection with those that it has previously stored locally.

In a normal scenario, the credentials will match.

If a man in the middle attack has been attempted, however, the certificate details will not match those originally associated with the remote endpoint, having been generated or substituted by the attacker.

This failure to match can be used as indication that an attack is taking place.

In a further enhancement of the invention, the probe software can periodically retrieve updates to the expected certificates from the managed service—this will be over a secured connection and will use additional checksums/digests such that the integrity of the managed service and the update can be checked first before installing the updates.

In a further enhancement of the invention, a co-operating managed security service, for example a cloud-based web security proxy, will harvest client connection and security details along with server response details—including certificate and security details—from a large number of client devices. As well as storing an aggregate of the details, it can also record the associations with a specific device.

These details can then be made available through the managed service so that the probe software is able to masquerade as the original client software, such that the content, frequency and security profile is indistinguishable at the network level from original client software.

This enhancement handles the situation where a sophisticated man in the middle attacker will only execute a man in the middle attack on specific high-value targets the client device may access, as opposed to all targets.

The sophisticated MitM attacker might be successful in evading detection if it were able to identify a dedicated security probes and disable the attack in these cases.

However, the use of managed service data from the network level that is typically not available on the device directly ensures that the probe samples are both relevant and impossible to distinguish from legitimate requests.

The managed service allows the probes to be customised for each device and/or class of device.

Figure 2:
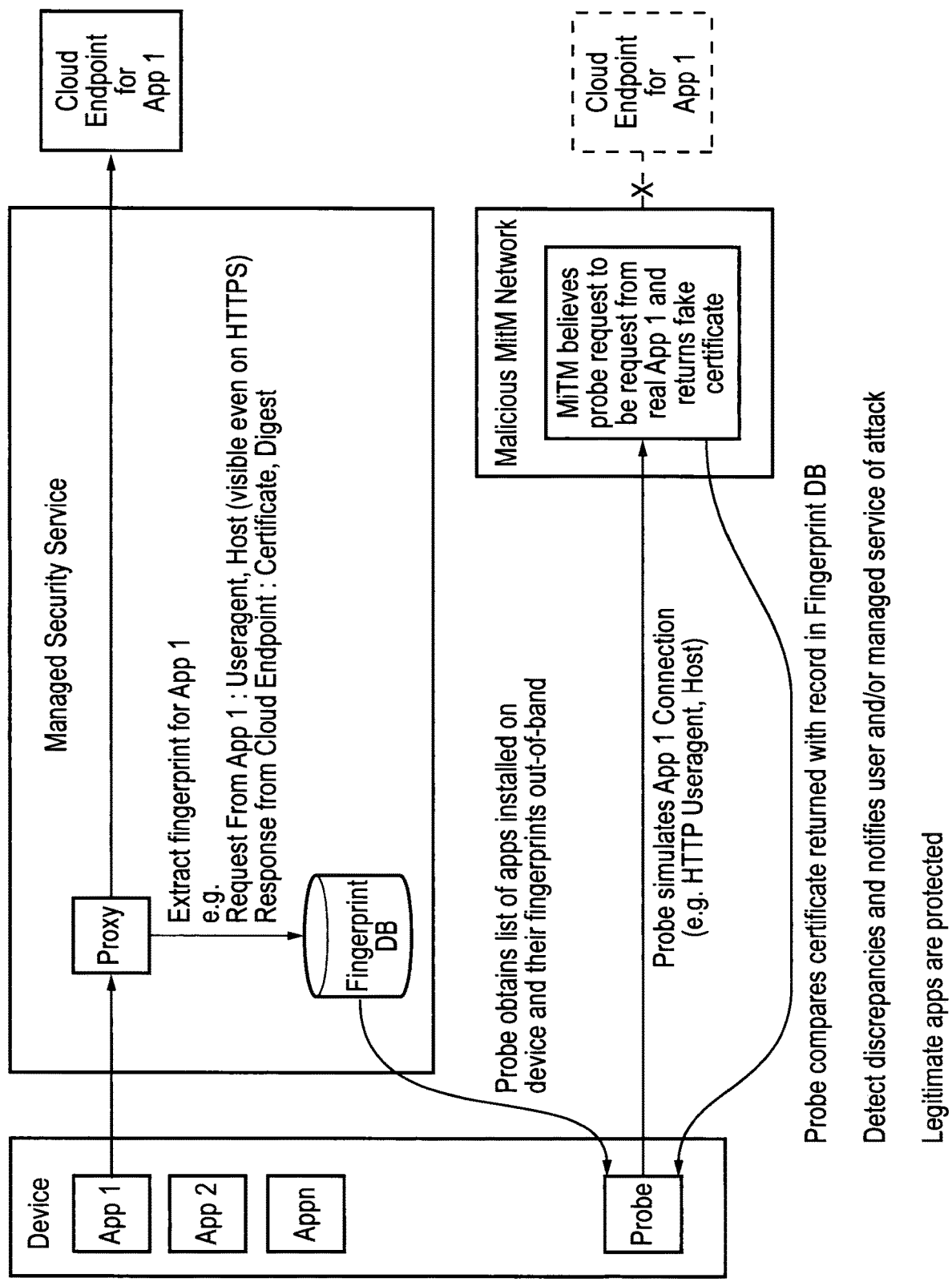
FIG. 2 illustrates the mechanism by which a probe request mimics an application request.

FIG. 2 illustrates the manner in which the probe software can operate to mimic requests sent from an application installed on the client device. In the example shown here, the probe is shown to mimic a request from "App 1" installed on the device. The probe may, however, be configured to mimic requests from any one or more applications installed on the device (e.g. "App 2" and "App 3 as well as "App 1").

As seen in FIG. 2, the probe software obtains a list of apps installed on the device, along with a "fingerprint" (alternatively referred to as a "signature") for each app. This fingerprint includes data taken from prior native requests sent by the app (or other instances on the app on other client devices) to a cloud endpoint for the app. These prior requests have been harvested by a proxy on the network (e.g. a managed security service) to build up a database of app fingerprints, as discussed further below in the context of FIG. 4. The fingerprint may include, for example, HTTP header information from the app request, such as Useragent and Host (both of which are visible even on HTTPS).

The probe software also retrieves (for example as part of the app "fingerprint") expected encryption credentials for the cloud endpoint. Typically these will include the endpoint's digital certificate and certificate digest but other encryption credentials may also be used in some cases.

The app "fingerprint" (or "signature") and the expected encryption credentials are retrieved out-of-band, over a secure connection. Once retrieved they may be stored at the client device for subsequent use. Alternatively, they may be retrieved every time the probe software is used. If this information is stored at the client device, it is preferably updated on a regular basis to ensure it is current.

As shown in the lower half of FIG. 2, the probe software then uses the app fingerprint to generate a connection initiation request that simulates a request from App 1 (for example by including HTTP Useragent and Host headers copied from the actual app requests).

In the case where the request is intercepted by a MiTM, the MiTM will believe that the request is from App 1, rather than from the probe software. This has the advantage that a sophisticated MiTM, targeted at a specific app, will act on the request. The MiTM then returns a fake certificate, which the probe software compares with the certificate record in the app fingerprint. In the case where the certificate is fake, detected discrepancies will cause the probe software to notify the user and/or the managed service of the attack.

Figure 3:
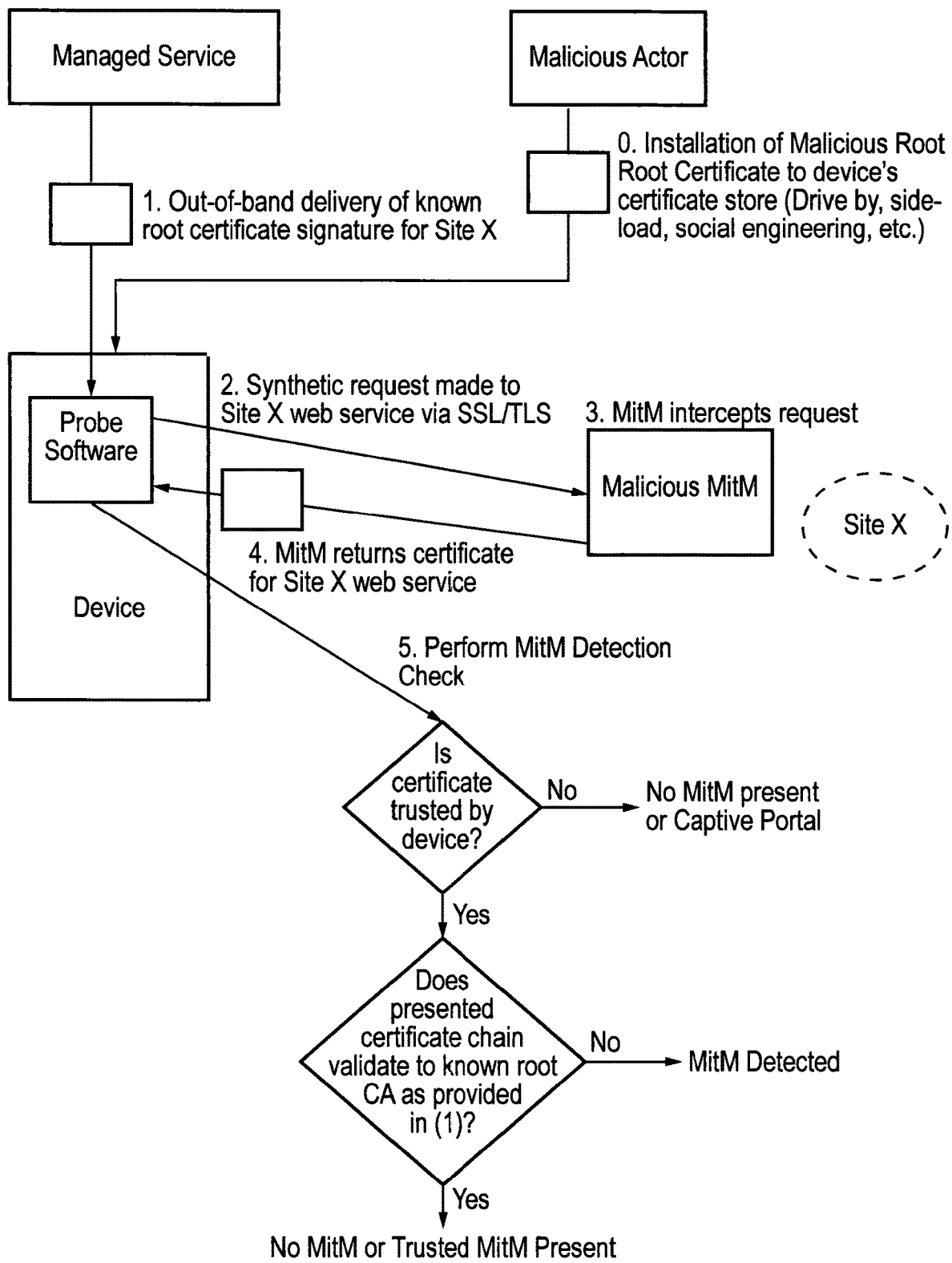
FIG. 3 illustrates the operation of a system and process for detecting man-in-the-middle attacks in accordance with an embodiment of the present invention.

This process is illustrated in a little more detail in FIG. 3, although the example illustrated here employ a generic request from the probe rather than one designed to mimic an app request. As shown in this figure, the known certificate for a specific end point (Site X) is delivered to the probe software on the client device out-of-band over a secure connection. Separately, in one form of malicious attack, a malicious actor installs a malicious (imposter) root certificate to the client device's root store—this installation may be as a result of various known forms of attack such as "drive by", "side load", via social engineering, etc.

In order to detect a MiTM attack in this example, the probe software sends a synthetic request to Site X web service via SSL/TLS. In the case where a MiTM is present, the MiTM intercepts the request and returns a certificate purporting to be the certificate from Site X. Once the Site X (or imposter Site X) certificate is received, the probe software then operates to establish whether a MiTM attack has taken place or not.

The software first determines whether the certificate is trusted by the device. If it is not then the assumption is that there is no MiTM attack.

If the certificate is trusted by the device (because it matches the certificate in the device root store), the probe software then compares the certificate with the known root certificate for Site X that is stored by the probe software (i.e. the copy that was previously delivered out-of-band from the managed service). If the Site X certificate received in response to the request from the probe matches the known root certificate stored by the probe software, then it is determined that there is no MiTM (or there is a trusted MiTM). On the other hand, if the received certificate does no match the stored certificate then a MiTM attack has been detected.

Figure 4:
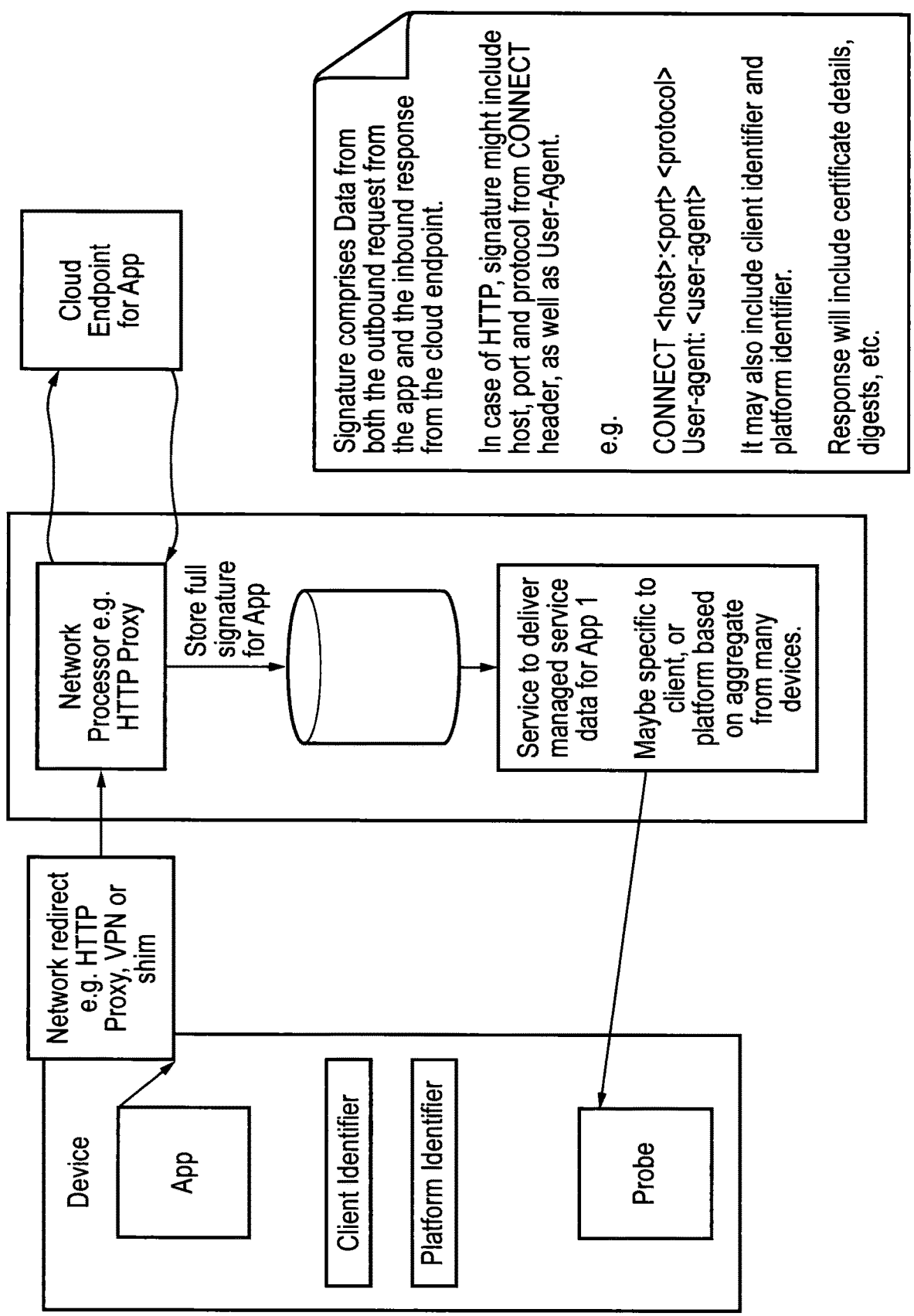
FIG. 4 illustrates a system and process for harvesting data from network requests sent by application programs in order to generate application "signatures" or "fingerprints".

FIG. 4 illustrates in a little more detail the process referred to above (in the discussion of FIG. 2) for harvesting App "signatures" (or "fingerprints").

Requests from an App installed on a client device are sent to a cloud endpoint via a network processor (e.g. an HTTP proxy, which may be part of a managed security service) by virtue of a network redirect (e.g. a HTTP Proxy, VPN or shim). The network processor extracts data from the requests from the App—in the case of HTTP, this data may include header data such as Useragent, host, port, protocol, etc. This extracted data is used as part of a "signature" (or "fingerprint") for the App, which is stored by the managed service.

The "signature" (or "fingerprint") may also include a client identifier and/or platform identifier, in order that the signature or fingerprint (and subsequent requests using the fingerprint/signature to mimic the App) can be made client and/or platform specific if required.

The signature or fingerprint may also include data extracted from the response from the cloud endpoint, typically certificate details, digests, etc.

The complete fingerprint for the App can then be delivered by the managed service to probe software installed on the client device and used as discussed above in relation to FIG. 2 to enable the probe software to mimic the App.

The App signatures (or fingerprints) stored by the managed service (and delivered to the probe software) may be specific to the particular client, specific to the platform (and be aggregated from requests from multiple clients on the same platform) or more generic, based on aggregate requests from multiple different clients across different platforms.

The skilled person will appreciate that the methods and systems illustrated in the Figures and described above are examples embodying inventive concepts described herein and that many and various modifications can be made without departing from the invention.

The invention claimed is:

1. A method for detecting a man-in-the-middle attack, the method comprising:
   obtaining, by probe software of a client device, an identification of one or more applications installed on the client device;
   obtaining, by the probe software of the client device, fingerprint data associated with the one or more applications, the fingerprint data corresponding to one or more prior requests sent by the one or more applications;
   generating, by the probe software of the client device using fingerprint data of an application of the one or more applications, a connection initiation request that simulates a request from the application to initiate a network connection with a remote end point;
   sending, by the probe software of the client device, the connection initiation request simulating the request from the application over a network, the connection initiation request being directed to the remote end point to at least partially initiate a secure network connection between the remote end point and the client device;
   receiving, at the client device, encryption credentials sent to the client device in response to the connection initiation request;
   comparing the received encryption credentials with expected encryption credentials for the remote end point;
   determining that a man-in-the-middle attack is present if the received encryption credentials do not match the expected encryption credentials; and
   generating a notification of the determined man-in-the-middle attack.

2. The method of claim 1, wherein the expected encryption credentials for the remote end point are stored on the client device as part of an installation process for the probe software.

3. The method of claim 1, wherein the expected encryption credentials or updates to the expected encryption credentials are retrieved by the probe software, subsequent to installation of the probe software on the client device, from a device over a secured network connection and stored on the client device.

4. The method of claim 3, wherein the device is a specific remote end point.

5. The method of claim 4, wherein the specific remote end point is a managed service.

6. The method of claim 1, wherein the fingerprint data is previously harvested from the one or more prior requests.

7. The method of claim 1, wherein at least one instance of the application is installed on a computing device other than the client device.

8. The method of claim 1, wherein the fingerprint data is harvested at a web security proxy in the network, and wherein the one or more prior requests are passed through the web security proxy.

9. The method of claim 1, further comprising:
   performing a cryptographic validation of the received encryption credentials against a root store of the client device for device-level trust determination; and
   determining whether the client device would automatically trust the received credentials or not.

10. The method of claim 1, wherein the probe software sends the connection initiation request in response to a change in a status of the client device.

11. The method of claim 10, wherein the change in the status is a network transition.

12. The method of claim 1, wherein the probe software sends the connection initiation request in response to a signal from a remote control.

13. The method of claim 12, wherein the remote control is a managed network security service.

14. A client device for detecting a man-in-the-middle attack, the client device comprising:
   a memory configured to store probe software; and
   one or more processors implemented in circuitry and coupled to the memory, the one or more processors being configured to:
      retrieve expected encryption credentials for a remote end point;
      obtain, using the probe software of the client device, an identification of one or more applications installed on the client device;
      obtain, using the probe software of the client device, fingerprint data associated with the one or more applications, the fingerprint data corresponding to one or more prior requests sent by the one or more applications;
      generate, using the probe software of the client device using fingerprint data of an application of the one or more applications, a connection initiation request that simulates a request from the application to initiate a network connection with a remote end point;
      send, using the probe software of the client device, the connection initiation request simulating the request from the application over a network, the connection initiation request being directed to the remote end point to at least partially initiate a secure network connection between the remote end point and the client device;

receive encryption credentials sent to the client device in response to the connection initiation request;

compare the received encryption credentials with the expected encryption credentials for the remote end point;

determine that a man-in-the-middle attack is present if the received encryption credentials do not match the expected encryption credentials; and generate a notification of the determined man-in-the-middle attack.

15. The client device of claim 14, wherein the fingerprint data is harvested at a web security proxy in the network, and wherein the one or more prior requests are passed through the web security proxy.

16. The client device of claim 14, wherein the one or more processors are configured to:

perform a cryptographic validation of the received encryption credentials against a root store of the client device for device-level trust determination; and determine whether the client device would automatically trust the received credentials or not.

17. The client device of claim 14, wherein the one or more processors are configured to send, using the probe software of the client device, the connection initiation request in response to a change in a status of the client device.

18. The client device of claim 14, wherein the one or more processors are configured to send, using the probe software of the client device, the connection initiation request in response to a signal from a remote control.

19. The client device of claim 18, wherein the remote control is a managed network security service.

20. A non-transitory computer-readable medium of a client device, the non-transitory computer-readable medium having stored thereon instructions that, when executed by one or more processors, cause the one or more processors to:

retrieve expected encryption credentials for a remote end point;

obtain, using probe software of the client device, an identification of one or more applications installed on the client device;

obtain, using the probe software of the client device, fingerprint data associated with the one or more applications, the fingerprint data corresponding to one or more prior requests sent by the one or more applications;

generate, using the probe software of the client device using fingerprint data of an application of the one or more applications, a connection initiation request that simulates a request from the application to initiate a network connection with a remote end point;

send, using the probe software of the client device, the connection initiation request simulating the request from the application over a network, the connection initiation request being directed to the remote end point to at least partially initiate a secure network connection between the remote end point and the client device;

receive encryption credentials sent to the client device in response to the connection initiation request;

compare the received encryption credentials with the expected encryption credentials for the remote end point;

determine that a man-in-the-middle attack is present if the received encryption credentials do not match the expected encryption credentials; and generate a notification of the determined man-in-the-middle attack.

\* \* \* \* \*